Nov. 10, 1925.

F. MAROVICH

WEATHER STRIP

Filed April 28, 1924

1,561,096

INVENTOR.
Frank Marovich

BY Thos. A. Donnelly
ATTORNEY.

Patented Nov. 10, 1925.

1,561,096

UNITED STATES PATENT OFFICE.

FRANK MAROVICH, OF DETROIT, MICHIGAN.

WEATHER STRIP.

Application filed April 28, 1924. Serial No. 709,400.

*To all whom it may concern:*

Be it known that I, FRANK MAROVICH, a citizen of the United States, residing at Detroit, in the county of Wayne and State of Michigan, have invented a new and useful Improvement in a Weather Strip, of which the following is a specification.

My invention relates to a new and useful improvement in a weather strip and has for its object the provision of a weather strip adapted for moving out of operative position upon the opening of a door and moving into operative position upon the closing of same.

Another object of the invention is the provision of a weather strip associated with a housing and having means projecting from one side of the housing for engaging an abutment associated with the door for moving the weather strip into operative position upon the closing of the door and having resilient means mounted in the housing for raising the weather strip free from engagement with the surface over which passed when the door is being opened.

Another object of the invention is the provision of a weather strip having a housing, and rockingly mounted on the housing and provided with resilient means for maintaining the weather strip in close engagement with the threshold of the door with which used when closed and provided with further resilient means for raising the weather strip out of engagement with the flooring when the door is moved to open position.

Other objects will appear hereinafter.

The invention consists in the combination and arrangement of parts hereinafter described and claimed.

The invention will be best understood from a reference to the accompanying drawings which form a part of this specification and in which, Fig. 1 is an elevational view of the invention showing the contents of the housing, Fig. 2 is a side elevational view of the invention showing it applied to a door, Fig. 3 is a sectional view taken on substantially line 3—3 of Fig. 1, Fig. 4 is a sectional view taken on substantially line 4—4 of Fig. 1, Fig. 5 is a fragmentary front elevational view of the housing illustrating the positioning of the abutment block.

The invention, in its preferred form, comprises a housing 8, adapted for mounting on a door 7. The housing comprises a main body portion having the securing flange 9 projecting from one side thereof, and provided with openings through which screws, or the like, may be passed and having end walls 10 and 11 integral with the main body portion. An offset 12 is provided at the front lower edge of the housing and terminates in an angularly turned portion 13 doubled upon itself, as at 14, to provide a channel in which is positioned the doubled-over portions 15 and 16 of the weather strip holding members 17 and 18 respectively. The outer end of the member 17 is angularly turned, as at 19, and the member 18 is buckled, as at 20, to provide a longitudinally extending reinforcing rib on the strip holder, the extreme outer end of the member 18 being angularly turned, as at 21, to provide gripping means for the engaging strip 22 which is made from rubber or some other suitable material. As shown in Fig. 3, the mounting of the engaging strip holder is of hinged construction so that it is permitted to rock in its mountings between the portions 13 and 14. As shown in Fig. 1, a boss 23 is formed on the upper surface of the member 18, adjacent one side of the reinforcing rib 20. Positioned in embracing relation over the boss 23 is one end 24 of a spiral spring 24', the opposite end of which engages a boss 25 formed on a rocker arm 26 which is fixedly mounted by means of a set screw 27 on a rod 28 which projects through a central wall 29 positioned in the housing, said central wall being provided with tongues 30 and 31 which are projected through openings formed in the wall of the housing and clinched so as to secure this wall 29 in position. If desired, the tongues may be covered with solder to render the housing waterproof. The rod 28 projects through a reinforcing wall 32 which also is provided with tongues projecting through the housing. Projecting through the wall 32, the rod 28 has an angularly turned portion 33 which extends between the wall 32 and the outer or end wall 10. As shown in Fig. 5, a portion of the front wall of the housing is cut away, as at 34, to permit the entry between the walls of an abutment block 35 between the wall 32 and the wall 10 upon the closing of the door. When the housing is secured to the door by suitable screws or other fastening means, upon a closing of the door 7, the angularly turned portion 33 of the rod will engage the beveled portion 35' of the abutment block. This will cause a rocking of the rod so as to bring the portion 33 into the position shown in Fig. 2 wherein it rides on the upper surface of the abutment block 35. As a rocking of the rod 28 is brought about, the arm 26 is caused to rock, pressing downwardly on the spring 24' so as to rock the members 17 and 18 to bring the engaging strip 22 into close contact with the threshold 7'. In this way, the weather strip is held firmly in engagement with the threshold 7' and an efficient weather strip is thus provided. The abutment block 35 is secured to the threshold 7' by means of a screw 36 which is positioned in a slot 37 formed in the abutment block, so that this block 35 may be adjusted longitudinally of its length on the threshold 7' to provide a tight, or a relatively loose engagement of the strip 22 with the threshold. The walls 32 and 29 are each provided with a notch 38 in which the reinforcing rib 20 may engage when the weather strip is raised to elevated or inoperative position. When the door is opened, the weather strip is raised to inoperative position by means of the spring 39, one end of which is attached to the reinforcing rib 20 and the other end of which is fastened to a hanger 40 mounted on the inner surface of the upper portion of the housing. The spring 39 is of less strength than the spring 24' so that, as the arm 28 is rocked, to bring the engaging strip 22 into engagement with the threshold 7', the strip is held in engagement against the tension of the spring 24'. Inasmuch as the spring 39 is used solely for raising the weather strip into inoperative position, it is not necessary that it be made of such strength as the spring 24'. An abutment block 41 is mounted in the housing to limit this raising of the weather strip. It is thus seen that I have provided a weather strip whereby the engaging strip may be raised into inoperative position so that no wear of this strip may be had while the door is being swung to or from closed position. By mounting the block 35 adjustably relatively to the threshold, means is provided for regulating the pressure with which the weather strip 22 engages the threshold. It is also apparent that the weather strip is held in engagement with the threshold 7' by the spring 24', so that the possibility of injuring the weather strip by exerting too great a pressure upon it, when the same is brought into contact with a threshold, is reduced to a minimum.

The doors with which weather strip of this kind are used generally open to the outside and by providing a housing of the nature set forth in the drawings, the weather strip itself is protected from damage because of the elements, as the housing will serve to shed a large percentage of rain, snow, etc., so as to shield the engaging strip 22. In this way, the life of the weather strip is prolonged and a device is provided which may be attached to a door without marring, to any great extent, the appearances of the same. In Fig. 2, I have shown, in dotted lines, the door moved to open position illustrating the downward movement of the angularly-turned portion 33 upon the raising of the weather strip into inoperative position.

While I have illustrated and described the preferred form of structure, I do not wish to limit myself to the precise form of structure shown, but desire to avail myself of such variations and modifications as come within the scope of the appended claims.

Having thus described my invention what I claim as new and desire to secure by Letters Patent is:

1. A weather strip comprising a housing, the lower edge of said housing being angularly turned and doubled upon itself; a plate extending longitudinally of said housing and having one edge angularly turned and interlocking with said angularly turned edge of said housing, to provide a hinged connection, said plate being buckled intermediate its edges, the buckled portion projecting upwardly, the free edge of said plate being angularly turned; an engagement strip; and means co-operating with said angularly turned free edge of said plate for retaining said engagement strip mounted thereon, said buckled portion of said plate providing a reinforcement therefor; a rockably mounted rod projected into said housing and having an angularly turned end; an abutment block adapted for engaging said angularly turned end of said rod for rocking the same; an arm secured to the opposite end of said rod; and a coiled spring positioned between the end of said arm and said plate for effecting a downward movement of said plate, relatively to said housing upon the rocking of said rod.

2. A weather strip comprising a housing, the lower edge of said housing being angularly turned and buckled upon itself; a plate extending longitudinally of said housing and having one edge angularly turned and interlocking with said angularly turned edge of said housing, to provide a hinged connection, said plate being buckled intermediate its edges, the buckled portion projecting upwardly, the free edge of said plate being angularly turned; an engagement strip; means co-operating with said angularly turned free edge of said plate for retaining said engagement strip mounted thereon, said buckled portion of said plate providing a reinforcement therefor; a rockably mounted rod projected into said housing and having an angularly turned end; an abutment block adapted for engaging said angularly turned end of said rod for rocking the same; an arm secured to the opposite end of said rod; a coiled spring positioned between the end of said arm and said plate, for effecting a downward movement of said plate, relatively to said housing upon the rocking of said rod; and a spring connected at one end to the upper portion of said housing and at the opposite end of said buckled portion of said plate, for normally retaining said strip in elevated position relatively to its mountings on said housing.

In testimony whereof I have signed the foregoing specification.

FRANK MAROVICH.